US012566819B2

(12) United States Patent
Chen

(10) Patent No.: US 12,566,819 B2
(45) Date of Patent: Mar. 3, 2026

(54) SYSTEMS AND METHODS FOR CLUSTERING ALGORITHMS FOR DATA ANALYSIS

(71) Applicant: Optum, Inc., Minnetonka, MN (US)

(72) Inventor: Hua Chen, Lubbock, TX (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/668,417

(22) Filed: May 20, 2024

(65) Prior Publication Data

US 2025/0355972 A1 Nov. 20, 2025

(51) Int. Cl.
*G06F 18/2323* (2023.01)

(52) U.S. Cl.
CPC ................................ *G06F 18/2323* (2023.01)

(58) Field of Classification Search
CPC .................................................. G06F 18/2323
See application file for complete search history.

(56) References Cited

U.S. PATENT DOCUMENTS

| | | | |
|---|---|---|---|
| 10,734,101 B2 | 8/2020 | Rajan et al. | |
| 2015/0199744 A1* | 7/2015 | Tolvanen | G06F 16/9537 |
| | | | 707/737 |
| 2018/0011972 A1* | 1/2018 | Rajan | G06F 16/24578 |
| 2020/0073865 A1* | 3/2020 | Jacob | G06F 16/2465 |
| 2023/0237128 A1* | 7/2023 | Russell | G06F 18/2323 |
| | | | 706/12 |
| 2024/0274301 A1* | 8/2024 | Awasthi | G16H 50/70 |
| 2025/0077860 A1* | 3/2025 | Chen | G06N 3/08 |

OTHER PUBLICATIONS

Lu et al., "Disease Prediction Using Graph Machine Learning Based on Electronic Health Data: A Review of Approaches and Trends," Healthcare, published on Apr. 4, 2023, retrieved from https://www.mdpi.com/2227-9032/11/7/1031 (21 pages).

* cited by examiner

*Primary Examiner* — Apu M Mofiz
*Assistant Examiner* — Oscar Wehovz
(74) *Attorney, Agent, or Firm* — Bookoff McAndrews, PLLC

(57) ABSTRACT

Systems and methods are disclosed for identifying relationships between complex datasets and/or high-dimensional datasets for predictive modeling. The method includes clustering data associated with one or more entities in a first dataset based on distance data; clustering the data associated with the one or more entities in a second dataset based on longitudinal data; consolidating the first dataset and the second dataset into a third dataset based on weights assigned to one or more edges between one or more nodes in the first dataset and the second dataset; generating a diagnosis space indicating a condition of the one or more entities based on the third dataset; and determining, via input of the diagnosis space into a machine learning model, an optimization of a weighting scheme for assigning weights to one or more features within the longitudinal data.

20 Claims, 5 Drawing Sheets

300

CLUSTERING OF ICD-10 CODES USING LONGITUDINAL PATIENT RECORD

CLUSTERING OF ICD-10 CODES AND CALCULATING EUCLIDEAN DISTANCES

CUSTOMIZABLE WEIGHTS

303

CUSTOMIZABLE WEIGHTS

301

COMBINING THE TWO CODE SETS USING CUSTOMIZED WEIGHTS

305

CUSTOMIZED DIMENSIONAL REDUCTION OF MEDICAL SPACE

307

USING THE PATIENT'S LONGITUDINAL EXPERIENCE TO CREATE SIMPLIFIED MAP OF PATIENT'S ILLNESS

FEEDBACK FOR SELECTION OF WEIGHTS

309

ML ALGORITHM BEING DEVELOPED OF INTEREST NEEDING PATIENT

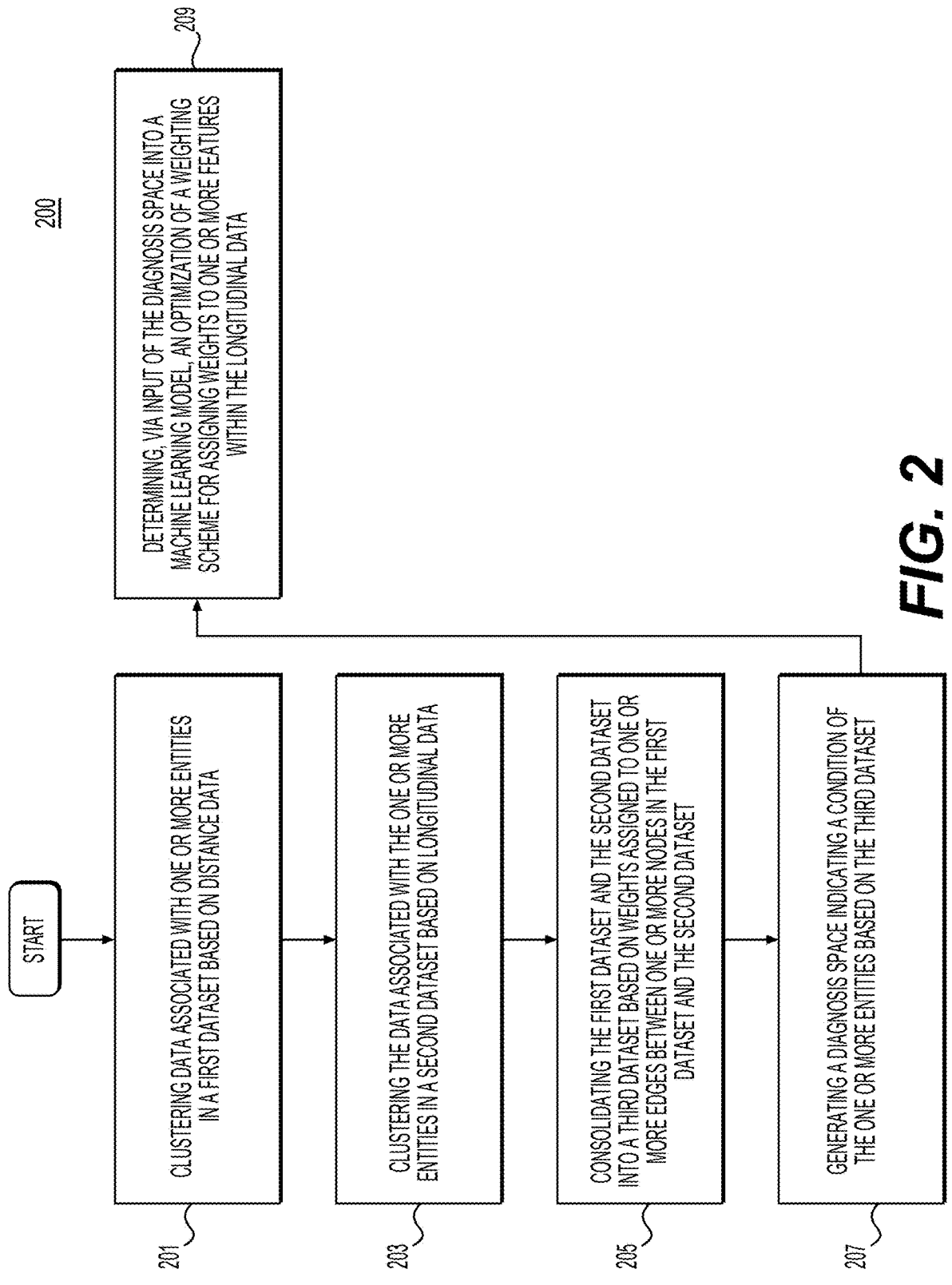

200

START

201 CLUSTERING DATA ASSOCIATED WITH ONE OR MORE ENTITIES IN A FIRST DATASET BASED ON DISTANCE DATA

203 CLUSTERING THE DATA ASSOCIATED WITH THE ONE OR MORE ENTITIES IN A SECOND DATASET BASED ON LONGITUDINAL DATA

205 CONSOLIDATING THE FIRST DATASET AND THE SECOND DATASET INTO A THIRD DATASET BASED ON WEIGHTS ASSIGNED TO ONE OR MORE EDGES BETWEEN ONE OR MORE NODES IN THE FIRST DATASET AND THE SECOND DATASET

207 GENERATING A DIAGNOSIS SPACE INDICATING A CONDITION OF THE ONE OR MORE ENTITIES BASED ON THE THIRD DATASET

209 DETERMINING, VIA INPUT OF THE DIAGNOSIS SPACE INTO A MACHINE LEARNING MODEL, AN OPTIMIZATION OF A WEIGHTING SCHEME FOR ASSIGNING WEIGHTS TO ONE OR MORE FEATURES WITHIN THE LONGITUDINAL DATA

*FIG. 2*

SYSTEMS AND METHODS FOR CLUSTERING ALGORITHMS FOR DATA ANALYSIS

TECHNICAL FIELD

This present disclosure relates generally to the field of data processing and predictive analytics. In particular, the present disclosure relates to identifying relationships between complex and high-dimensional datasets for accurate predictive modeling.

BACKGROUND

Conventional methods face technical challenges when dealing with data having complex relationships. These challenges are primarily due to limitations in capturing non-linear and intricate patterns within data. Conventional methods also struggle when faced with complex interdependencies and interactions in datasets. For example, traditional statistical approaches often oversimplify relationships, leading to inaccurate representations of the underlying complexities in the data.

Additionally, conventional methods do not scale well with high-dimensional data, making it difficult to discern meaningful patterns in datasets with numerous variables. For example, diseases exhibit complex interactions, with shared risk factors, overlapping symptoms, and varying responses to treatment. Conventional methods do not efficiently handle the non-linear relationships, irregularities, and interactions present in datasets, resulting in suboptimal clustering results. There is a need for improved methods for clustering disease states to enhance the accuracy and granularity of data analysis, enabling precise identification of patterns and correlations within the complex relationship between diseases

SUMMARY OF THE DISCLOSURE

The present disclosure solves the technical challenges typically encountered during the use of a conventional method, such as those discussed above. Specifically, the present disclosure solved the technical challenges by identifying relationships between complex datasets or high-dimensional datasets for predictive modeling to discover hidden patterns and correlations for informed decision-making.

In some embodiments, a computer-implemented method includes: clustering, by one or more processors, data associated with one or more entities in a first dataset based on distance data; clustering, by the one or more processors, the data associated with the one or more entities in a second dataset based on longitudinal data; consolidating, by the one or more processors, the first dataset and the second dataset into a third dataset based on weights assigned to one or more edges between one or more nodes in the first dataset and the second dataset; generating, by the one or more processors, a diagnosis space indicating a condition of the one or more entities based on the third dataset; and determining, by the one or more processors via input of the diagnosis space into a machine learning model, an optimization of a weighting scheme for assigning weights to one or more features within the longitudinal data.

In some embodiments, a system comprising: one or more processors of a computing system; and at least one non-transitory computer readable medium storing instructions which, when executed by the one or more processors, cause the one or more processors to perform operations including: clustering data associated with one or more entities in a first dataset based on distance data; clustering the data associated with the one or more entities in a second dataset based on longitudinal data; consolidating the first dataset and the second dataset into a third dataset based on weights assigned to one or more edges between one or more nodes in the first dataset and the second dataset; generating a diagnosis space indicating a condition of the one or more entities based on the third dataset; and determining, via input of the diagnosis space into a machine learning model, an optimization of a weighting scheme for assigning weights to one or more features within the longitudinal data.

In some embodiments, a non-transitory computer readable medium storing instructions which, when executed by one or more processors of a computing system, cause the one or more processors to perform operations including: clustering data associated with one or more entities in a first dataset based on distance data; clustering the data associated with the one or more entities in a second dataset based on longitudinal data; consolidating the first dataset and the second dataset into a third dataset based on weights assigned to one or more edges between one or more nodes in the first dataset and the second dataset; generating a diagnosis space indicating a condition of the one or more entities based on the third dataset; and determining, via input of the diagnosis space into a machine learning model, an optimization of a weighting scheme for assigning weights to one or more features within the longitudinal data.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

FIG. 2 is a flowchart of a process for identifying relationships between complex datasets and/or high-dimensional datasets for predictive modeling, according to aspects of the disclosure.

DETAILED DESCRIPTION OF EMBODIMENTS

Figure 1:
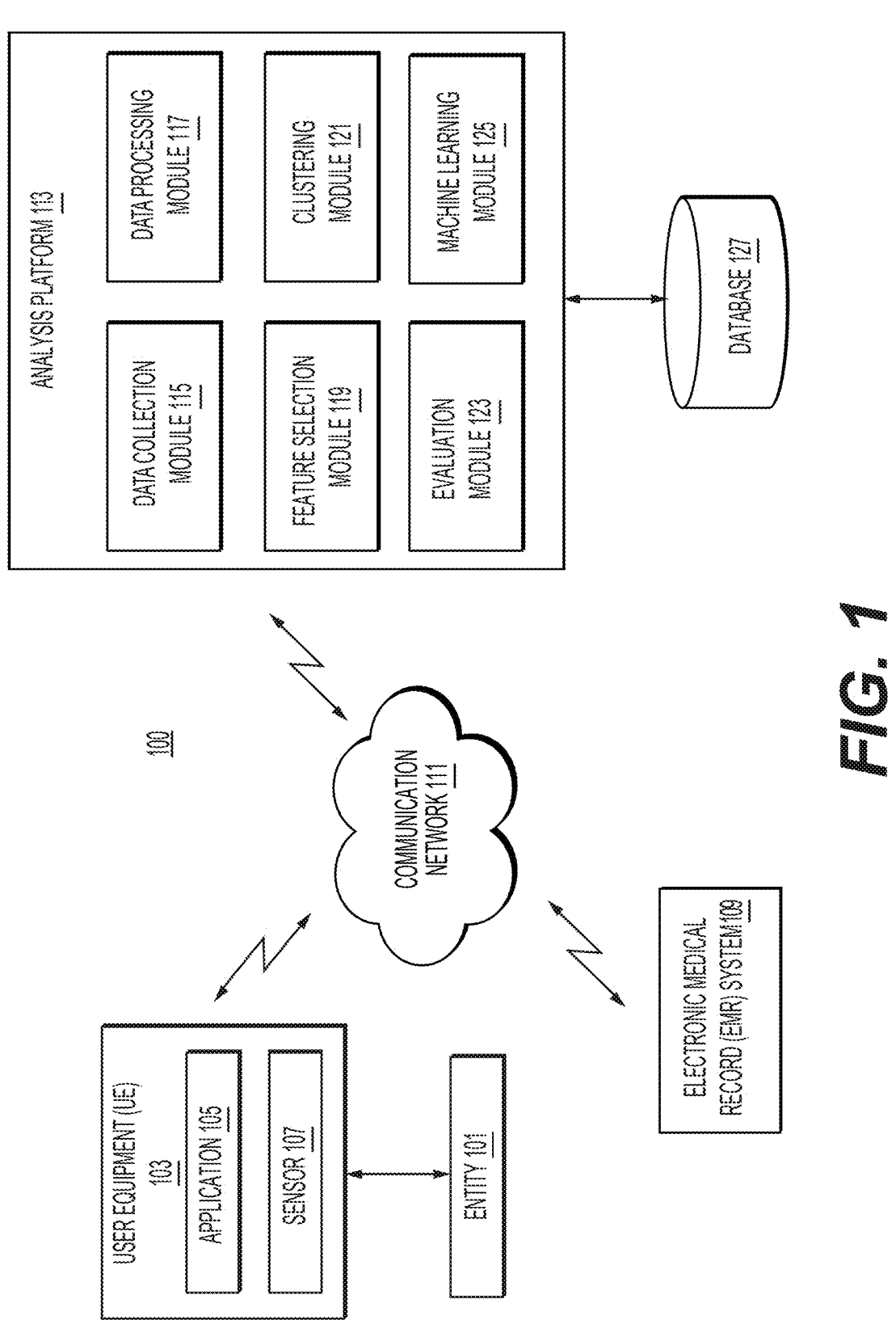
FIG. 1 is a diagram showing an example of a system for identifying relationships between complex datasets and/or high-dimensional datasets for predictive modeling, according to aspects of the disclosure.

This present disclosure relates generally to the field of data processing and predictive analytics. In particular, the present disclosure relates to identifying relationship between complex and high-dimensional datasets for accurate predictive modeling.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments are not to be considered as limited by the foregoing description.

Various non-limiting embodiments of the present disclosure will now be described to provide an overall understanding of the principles of the structure, function, and use of systems and methods disclosed herein for clustering complex and high-dimensional datasets for identifying patterns among diverse features, improved understanding of the structure within the dataset, simplification of datasets, targeted strategies tailored for each cluster within the datasets, and informed decision-making.

The analysis of data (e.g., medical data), specifically in the area of market and customer segmentation, risk management, fraud detection, and diagnoses is complex due to the high dimensionality of the spaces the data occupies (e.g., in time, variability, and links of content ideas). The high dimensionality of the data poses computational difficulties. For example, variability of the data necessitates sophisticated statistical and/or machine learning techniques to discern meaningful patterns, identify relationships, or otherwise generate useful outputs from analysis of the data. The interconnections among data features (e.g., symptoms, diagnoses, and treatments), demand advanced analytical methods to capture complex relationships effectively. The temporal dimension of data adds to this complexity (e.g., introduces variability over time, as medical conditions progress, treatments are administered, and new data points are generated), with specialized time-series analysis or other intensive processes being necessary to comprehend evolving trends. Traditional clustering techniques (e.g., k-means, hierarchical clustering) have limitations in dealing with data with complex relationships. For example, when clustering disease states, these techniques face challenges in mapping complex relationships between diseases.

Current methods for analyzing data have limitations in identifying patterns, leading to inefficiencies. For example, some methods struggle to handle the high dimensionality and complexity of medical data, leading to over-simplification and failure to identify subtle but significant patterns. Also, the lack of interoperability and standardized data formats across systems makes it challenging for current methods to integrate diverse datasets, hindering a comprehensive understanding of conditions and outcomes. In data analytics (e.g., healthcare data analytics), the dynamic nature of medical data, characterized by constantly evolving treatment protocols and medical knowledge, requires development and utilization of adaptive analytical models that can effectively capture and analyze temporal trends with precision. The present disclosure provides embodiments that address the above shortcomings in the field of data processing and predictive analytics, leading to significant technical improvements in the field. System 100 discussed in the present disclosure overcomes technical shortcomings of conventional techniques by, for example, applying a combination of distance-based similarity technique(s) and network graph clustering algorithm(s) to capture complex relationships between disease states and represent patient conditions in a mathematical space for further analysis.

In one example, distance-based similarity technique(s) provide a measure of similarity between data points based on their feature vectors, helping reduce the impact of high dimensionality by emphasizing relevant relationships. In another example, network graph clustering algorithm(s) utilizes the underlying structure and connectivity patterns within the data to identify cohesive groups, further enhancing the ability of system 100 to discern meaningful patterns in high-dimensional spaces. Such a combination of distance-based similarity technique(s) and network graph clustering algorithm(s) allows for a more robust and nuanced analysis of complex datasets, facilitating more accurate and insightful data exploration and interpretation.

In one embodiment, the system 100 clusters data associated with one or more entities in a first dataset based on distance data. The system 100 clusters the data associated with the one or more entities in a second dataset based on longitudinal data. The system 100 consolidates the first dataset and the second dataset into a third dataset based on weights assigned to one or more edges between one or more nodes in the first dataset and the second dataset. The system 100 generates a diagnosis space indicating a condition of the one or more entities based on the third dataset. The system 100 determines, via input of the diagnosis space into a machine learning model, an optimization of a weighting scheme for assigning weights to one or more features within the longitudinal data.

In one instance, the system 100 efficiently manages sparse datasets with high proportions of missing or space values. For example, system 100 effectively processes and analyzes sparse datasets where a significant amount of information is incomplete or missing. This capability is valuable in a medical setting, where datasets may be large and heterogeneous, and missing data is common due to various factors such as incomplete documentation, privacy concerns, etc. In one instance, the system 100 utilizes a graph-based approach that involves representing medical conditions, treatments, and other relevant entities as nodes in a network, with connections (edges) indicating relationships between them. By analyzing this network, intricate relationships between medical conditions can be uncovered, providing valuable insights into disease interactions. For example, nodes representing different medical conditions may be connected if they commonly co-occur in patients, share risk factors, or have similar treatment strategies. The system 100 assists professionals (e.g., medical professionals) in analyzing the relationship between diagnostic codes for identifying patterns and trends to make informed decisions regarding diagnosis, treatment planning, and patient management.

In one instance, the system 100 translates the medical space into a mathematical space by representing complex medical data in a structured format suitable for analysis using machine learning models. The system 100 utilizes various machine learning models, such as principal component analysis (PCA) for dimensionality reduction or regression models for predictive modeling, which are applied to this mathematical representation of the medical space. PCA facilitates the reduction of high-dimensional medical data into a lower-dimensional subspace while preserving important patterns and variance. Regression models, on the other hand, enable the prediction of clinical outcomes or continuous variables based on the learned relationships between input features and target variables.

The above technical improvements, and additional technical improvements, are described in detail throughout the present disclosure. Also, it should be apparent to a person of ordinary skill in the art that the technical improvements of the embodiments provided by the present disclosure are not limited to those explicitly discussed herein, and that additional technical improvements exist.

FIG. 1 introduces a capability to implement modern communication and data processing capabilities into methods and systems for identifying relationships between complex datasets and/or high-dimensional datasets for predictive modeling. FIG. 1, an example architecture of one or more example embodiments of the present disclosure, includes the system 100 that comprises an entity 101, a user equipment (UE) 103 that includes application(s) 105 and sensor(s) 107, an electronic medical record (EMR) system 109, a communication network 111, an analysis platform 113, and a database 127.

In one instance, the entity 101 is a professional entity (e.g., physicians, nurses, medical administrative staff, medical coders, etc.) entering health-related data of one or more patients, via the UE 103, into medical records and healthcare information systems. In one example, entity 101 documents medical histories, diagnoses, treatments, and prescriptions for their patients. Entity 101 assigns international classification of diseases (ICD) codes to document patient diagnoses and current procedural terminology (CPT) codes to record procedures and services rendered to the patients. In one example, medical coders review medical records, physician documentation, and other relevant information to accurately assign ICD and CPT codes according to established coding guidelines and regulations. In another example, ICD and CPT codes are automatically assigned using various technologies and tools. For example, natural language processing (NLP) algorithms parse unstructured texts from clinical documentation to identify key clinical concepts and match them with corresponding codes, while machine learning model learns from labeled datasets to predict codes based on input data. For example, the machine learning model analyzes clinical documentation (e.g., physicians notes, diagnostic reports, procedure descriptions, etc.) to extract relevant information and map it to the appropriate codes. Such automated coding systems help streamline the coding process, reduce errors, and improve coding accuracy.

In one instance, the UE 103 includes, but is not restricted to, any type of mobile terminal, wireless terminal, fixed terminal, or portable terminal. Examples of the UE 103, include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including accessories and peripherals for these devices, or any combination thereof. In addition, the UE 103 facilitates various input means for receiving and generating information, including, but not restricted to, a touch screen capability, a keyboard, keypad data entry, a voice-based input mechanism, and the like. Any known and future implementations of the UE 103 are also applicable. In one example, by utilizing the touchscreens and voice-based input mechanism of the UE 103, the entity 101 can input medical history, symptoms, diagnosis, and treatment plan with ease.

In one instance, the application 105 includes various applications such as, content provisioning applications, software applications, networking applications, multimedia applications, camera/imaging applications, storage services, contextual information determination services, location-based services, notification services, and the like. In one embodiment, one of the applications 105 at the UE 103 acts as a client for the analysis platform 113 and performs one or more functions associated with the functions of the analysis platform 113 by interacting with the analysis platform 113 over the communication network 111.

By way of example, the sensor 107 includes any type of sensor. In one instance, the sensors 107 include, for example, a network detection sensor for detecting wireless signals or receivers for different short-range communications (e.g., Bluetooth, Wi-Fi, Li-Fi, near field communication (NFC), etc.) from the communication network 111, a camera/imaging sensor for gathering image data (e.g., images of medical reports of the patients), an audio recorder for gathering audio data (e.g., recordings of medical treatments or medical diagnosis of the patients), and the like.

In one embodiment, the EMR system 109 is an automated system for capturing data (e.g., medical or health data) associated with the patients from various databases (e.g., healthcare provider databases, state government databases, federal government databases, public health institutions databases (e.g., Center for Medicare & Medicaid Services (CMS) database), etc.) to generate electronic records for transmission to participating systems (e.g., analysis platform 113). The EMR system 109 transforms a subject's (e.g., patient's) medical chart from a static record into a dynamic, comprehensive record linked to various databases. In one example, the EMR system 109 utilizes procedural codes (e.g., CPT codes, ICD codes, etc.) for documenting procedures, diagnoses, and treatments to enable accurate billings and claims processing. For example, CPT codes provide standardized descriptions and identifiers for medical services and procedures performed on patients to facilitate accurate billing and reimbursement processes. For example, ICD codes categorize and classify diseases, injuries, and health conditions diagnosed and treated by entity 101. EMR system 109 integrating CPT codes and ICD codes enhances accuracy in documentation, coding, and billing practices.

In one instance, various elements of the system 100 communicate with each other through the communication network 111. The communication network 111 represents a variety of different communication protocols and communication techniques. In one embodiment, the communication network 111 allows the analysis platform 113 to communicate with the UE 103. The communication network 111 of the system 100 includes one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, the analysis platform 113 is a platform with multiple interconnected components. The analysis platform 113 includes one or more servers, intelligent networking devices, computing devices, components, and corresponding software for identifying relationships between complex datasets and/or high-dimensional datasets for predictive modeling. In addition, it is noted that the analysis platform 113 may be a separate entity of the system 100.

The reliance on large but sparse structured data in conventional methods poses several challenges, for example, sparse data have a significant amount of missing or incomplete information, leading to inaccuracies in analysis and decision-making process (e.g., fraud detection, claims, utilization management, and triaging). In addition, dependence on significant manual analysis and, in turn, on subject matter expertise of the analyst, presents considerable obstacles in terms of time, resources, and potential for human error. By automating the data review process, the analysis platform 113 reduces the need for manual review, streamlining processes.

There are complicated interrelationships between medical diagnoses and medical treatments. For example, one diagnosis can lead to another at a later time. Multiple diagnoses can also coexist at the same time if they are pathophysiologically linked (e.g., same medical treatment can sometimes be used across varied types of medical diagnoses, or medical treatments rendered can also trigger new medical illnesses). The analysis platform 113 utilizes network graphing and clustering techniques to project a complicated system of data points, such as medical datasets, into a mathematical space. The network graphing and clustering techniques rely on creating a network graph consisting of nodes and edges, and based on the linkages of the nodes and edges, complicated relationships can be simplified by clustering. Such techniques simplify complicated interrelated systems for understanding, visualization, and analysis.

In one instance, the analysis platform 113, by utilizing network graphs, captures complicated interrelationships between datasets and simplifies the handling of medical diagnoses by grouping related diagnoses. Instead of treating each diagnosis as unique, the analysis platform 113 uses a network clustering algorithm to group similar diagnoses based on their interrelationships. This approach allows the analysis platform 113 to treat the presence of one disease as equivalent to the presence of other related diseases in terms of the utilization of medical services. By grouping patients with similar diagnoses and medical conditions together, the analysis platform 113 analyzes and predicts patterns of care, identifies areas for improvement, and compares outcomes across patient groups. This simplification of medical diagnoses into a limited N-dimensional space (e.g., mathematical space) also allows the analysis platform 113 to identify relationships between diagnoses and treatments. The analysis platform 113 by utilizing such clustering techniques enables mathematically efficient comparisons between different disease processes, disease analysis, disease progression, and a prediction of a subject's medical needs.

The analysis platform 113 harnesses the power of different types of clustering algorithms and combines them to handle sparse claims datasets in the medical domain to create a customized view of the medical journey. By combining geometric and graph structures, the analysis platform 113 efficiently captures complex relationships and connections between various diagnosis codes.

In one embodiment, the analysis platform 113 implements versatile linkage methods where different algorithms are configured for clustering and their results are combined to enable exploration of the medical diagnosis space. In one embodiment, the analysis platform 113 utilizes a customized weighting system that integrates various weighting schemes to capture diverse relationships within data effectively. This system assigns weights to different types of linkages based on their relevance, significance, and context within the dataset. In one embodiment, the analysis platform 113 generates a comprehensive perspective (e.g., Gestalt view) based on the analysis of a dataset. By capturing broader patterns and interdependencies within the data, such comprehensive perspectives allow analysts to perceive complex relationships and structures that may not be immediately apparent through traditional analytical methods. In one embodiment, the analysis platform 113 has customization capabilities such that it can be customized or tailored for specific purposes, facilitating investigations focused on particular targets of interest.

In one embodiment, the analysis platform 113 comprises a data collection module 115, a data processing module 117, a feature selection module 119, a clustering module 121, an evaluation module 123, a machine learning module 125, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one embodiment, the data collection module 115 collects relevant data associated with patients (e.g., medical data) through various data collection techniques. In one embodiment, the data collection module 115 uses a web-crawling component to access various databases (e.g., the EMR system 109, the database 127, or other information sources (e.g., any third-party databases)), to collect the relevant data. Through seamless interaction with various databases, the data collection module 115 captures real-time data updates, ensuring data accuracy and completeness, minimizing errors and enhancing the reliability of the collected data. In one embodiment, the data collection module 115 includes various software applications (e.g., data mining applications in Extended Meta Language (XML)) that automatically search for and return relevant data associated with the patients.

In one embodiment, the data collection module 115 transmits the collected data to the data processing module 117. The data processing module 117 performs data standardization and/or data cleansing on the collected data. In one instance, data standardization includes standardizing and unifying data so that the data are easily processed by other modules. In one instance, the data cleansing includes removing or correcting erroneous data (e.g., redundant, incomplete, or incorrect data) to create high-quality data or validating and correcting values against a known list of entities. The data cleansing technique also includes data enhancement, where data is made more complete by adding related information.

In one embodiment, the data processing module 117 transmits the processed data to the feature selection module 119 for identifying and prioritizing relevant attributes from complex datasets. In one instance, the feature selection module 119 analyzes the processed data to understand distribution, variability, and relationships between different features. The feature selection module 119 utilizes various techniques (e.g., statistical tests, correlation analysis, or machine learning models) to rank features based on their importance with respect to a clustering task. In one example, feature selection is an iterative process, where different subsets of features are evaluated and compared based on their impact on clustering performances. It may involve experimentation with different feature sets and assessing the resulting cluster quality.

In one embodiment, the feature selection module 119 transmits the relevant features to the clustering module 121. The clustering module 121 employs various clustering algorithms tailored to the unique characteristics and requirements of medical datasets, allowing for the discovery of hidden patterns and relationships within complex data. By grouping similar patient profiles or disease patterns together, the clustering module 121 module provides insights into disease progression, treatment effectiveness, and patient stratification. In one embodiment, the clustering module 121 implements a two-stage approach. In a first stage, the clustering module 121 creates a simplified ICD-10 code structure by clustering related ICD-10 codes using the network graph algorithm to capture the interrelated nature of the codes, as shown in the below steps.

Step 1: The clustering module 121 organizes the dataset by treatment (e.g., ICD-10 codes, current procedural terminology (CPT), healthcare common procedure coding system (HCPCS), J-code, drug code, etc.). The clustering module 121 groups similar ICD codes together using the ICD-10 structure as a measurement of distance from one code to another. In one example, clustering module 121 utilizes density-based spatial clustering of applications with noise (DBSCAN), a flexible clustering algorithm that iteratively looks at the nearest neighbors and creates a cluster from them. Each cluster of similar codes is simplified to a simplified ICD-10 code. In one example, clustering module 121 clusters various subtypes of type 2 diabetes into a single cluster represented by ICD-10 code E11.xxx due to their close similarity and small distance in terms of clinical characteristics, with strong edges reinforcing the associated to the ICD-10 code E11.xxx based on their identification. Other medical diagnoses, such as morbid obesity (ICD-10 code E66.xx), may also be associated with the ICD-10 code E11.xxx within the clustering, albeit with weaker edges, reflecting their less direct but still relevant connection to type 2 diabetes.

Step 2: The clustering module 121 organizes the dataset by unique patient identifier. Patients with concurrent ICD-10 codes have linkages between their codes, representing associations between various medical conditions or diagnoses. For example, if a patient has two separate hospitalizations for acute ischemic heart disease (e.g., ICD-10 code 124.9) and for acute ischemic stroke (e.g., ICD-10 code 163.9), an edge is drawn between these two codes to signify their association or similarity in a network representation of medical data. In one instance, the strength of the edge is determined by the frequency of association between pairs of ICD codes among the patients in the dataset. For example, since many patients with severe heart disease do end up with severe strokes (the two are tied medically), and there would be a stronger edge between the two disease entities.

Step 3: The clustering module 121 combines the edges between Step 1 and Step 2 into a complete network graph. The weights of these linkages can be reconciled between the two steps using methods such as (i) expert opinion, as they assign classes of weights to edges in the dataset based on their knowledge, (ii) statistical techniques such as calculating minimum, maximum, or standard deviation provide measures of dispersion or central tendency within a dataset, aiding in understanding the variability and distribution of data, and (iii) Bayesian probabilities that represent the likelihood of two events occurring together.

Step 4: The clustering module 121 utilizes a network graph clustering algorithm to assign ICD-10 codes to medical clusters based on their connectivity within the graph, wherein codes with similar patterns of co-occurrence are grouped. The clustering module 121 may use different types of clustering algorithms, such as Spectral Clustering, Graph clustering using the Louvaine-Algorithm, Random-walk, etc. In one instance, the number of clusters can be determined through expert opinion or by employing statistical, numerical, or computational methods to identify optimal clustering solutions based on data-driven criteria.

In a second stage, the clustering module 121 converts the subject's longitudinal medical record containing the ICD-10 code with the associated dates to a series of weights associated with each of the clusters (identified in previous steps 1-4) by quantifying the extent of their association with different cluster over time, reflecting the evolving patterns of their medical conditions. These weights that are associated with each patient are used to analyze and compare the subject's medical journey. The clustering module 121 maps each subject's longitudinal record into the simplified medical diagnosis space (e.g., mathematical space) by:

Step 1: The clustering module 121 arranges each subject's medical record in chronological order, mapping each instance of the ICD-10 code to the corresponding cluster identifier (identified in previous steps), facilitating the organization and analysis of patient data based on shared characteristics identified through clustering.

Step 2: The clustering module 121 associates each patient with a set of weights linked to each medical cluster (as identified in the previous steps). The value of the weights is determined by an incremental increase by each ICD-10 that matches that sub-cluster with the increments matched to an algorithm that will allow the assignment of increased weights for prolonged duration and/or increased frequency. The way this is done corresponds to logarithmic increases with each instance of the ICD-10 code and/or an exponential decay based on most recent instance of a related ICD-10 code.

The outlined steps establish a mathematical representation of a subject's composite illness by integrating various medical factors and capturing the severity of the disease process, enabling comprehensive analysis of patients' illness journeys and treatment outcomes. By tracking these weights over time, it enables the analysis of a subject's illness journey, facilitating comparisons between patients by identifying similar patients in their illness journey even if they do not co-exist within the same time frame.

Such a combination of clustering techniques and the customized assignment of weights to the combination of clustering algorithms is unique. The first level of clustering leverages the structure of the ICD-10 codes structure to group related diagnoses that are shared by the same treatment code. This allows closely-related codes (e.g., Diabetes Type II and Diabetes Type II with renal failure) to be strongly linked. The concurrent use of ICD-10 codes to filter and select shared disease codes is unique especially when it is combined with other weight selection algorithms described herein.

The use of adjustable weights to link non-related disease codes is beneficial. For example, erythromycin, an antibiotic, can be used to treat multiple types of diseases (e.g., Legionnaire's disease (a bacterial disease of the lungs), gonorrhea (a bacterial pelvic disease), and gastroparesis (a functional disease of the gut)). The weights linking these diseases are different from the weights assigned for disease linkages for insulin (e.g., different types of diabetes and use for emergency treatment of potassium), reflecting the varying strength or significance of their association.

The inclusion of weights and the use of parameter tuning to assign weights to disease entities linked by patient co-diagnosis shared disease probabilities into the combined medical clustering algorithm is also unique.

This customized and inclusive approach to building a combined network graph of related disease conditions is novel. The combination and usage of multiple clustering algorithms to build one network graph is a powerful, flexible, and intuitive dimension reduction technique that maps a simplified mathematical medical space. In one example, this system of clustering can be applied to any medical dataset (e.g., a sparse dataset such as claims or datasets used for claims and utilization management as the elements of a medical diagnosis and requested medical intervention are well captured in these datasets). The system 100 identifies patterns in medical illnesses and medical utilization.

In one embodiment, the clustering module 121 transmits the clustered data to the evaluation module 123. The evaluation module 123 assesses the quality and efficacy of the generated clusters. In one example, the evaluation module 123 employs metrics and techniques to quantify the performance of the clustering algorithms and the resulting clusters. The evaluation module 123 validates the performance of the clustering algorithms, ensuring that they effectively capture underlying patterns and structures within the data. The evaluation module 123 provides a quantitative measure of cluster cohesion and separation, enabling the identification of well-separated and internally cohesive clusters. By providing feedback on the strengths and limitations of clustering methodologies and parameter settings, the evaluation module 123 facilitates iterative refinement and optimization of clustering approaches.

The clustered and evaluated data is provided to the machine learning module 125 for leveraging machine learning algorithms to extract actionable insights, make predictions, or automate decision-making processes. In one embodiment, the machine learning module 125 is configured as a supervised machine learning model that utilizes training data (e.g., training data 412 illustrated in the training flow chart 400 and described below) for training machine learning models to uncover complex patterns and relationship within clustered datasets. By leveraging the clustered data, the machine learning module 125 trains these models to classify new data points into existing clusters. The machine learning module 125 iteratively refines and updates the machine learning models based on feedback from the clustered data.

In one example, the machine learning module 125 performs model training using training data, e.g., data from other modules, that contains input data matched with correct output data, to allow the model to learn over time. The training is performed based on the deviation of a result from a documented result when the inputs are fed into the machine learning model, e.g., an algorithm measures accuracy through a loss function, adjusting until the error has been sufficiently minimized. In one embodiment, the machine learning module 125 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine learning module 125 implements various machine learning techniques, e.g., K-nearest neighbors, cox proportional hazards model, decision tree learning, association rule learning, neural network (e.g., recurrent neural networks, graph convolutional neural networks, deep neural networks), regression, inductive programming logic, support vector machines, Bayesian models, Gradient boosted machines (GBM), LightGBM (LGBM), Xtra tree classifier, etc.

The above-described modules and components of the analysis platform 113 are implemented in hardware, firmware, software, or a combination thereof. Though depicted as a separate entity in FIG. 1, it is contemplated that the analysis platform 113 is also implemented for direct operation by the respective UE 103. As such, the analysis platform 113 generates direct signal inputs by way of the operating system of the UE 103. In another embodiment, one or more of the modules 115-125 are implemented for operation by the respective UEs, as the analysis platform 113. The various executions presented herein contemplate any and all arrangements and models.

In one embodiment, the database 127 is any type of database, such as relational, hierarchical, object-oriented, and/or the like, wherein data are organized in any suitable manner, including data tables or lookup tables. In one embodiment, the database 127 accesses or includes any suitable data (e.g., clustering data, user-related medical data, ICD codes, ICD-10 codes, patient identifier unique key, time stamp of when a service was rendered, etc.) for aiding in the content provisioning and sharing process during data analytics for identifying relationships between complex or high-dimensional datasets. It is understood that other suitable data may be included in the database 127. By centralizing and organizing vast amounts of patient-related data, database 127 facilitates efficient data retrieval, management, and analysis. In one embodiment, the database facilitates the creation of personalized patent profiles based on clustering results, and supports targeted interventions, treatment plans, and preventive strategies. Moreover, it fosters collaboration among healthcare professionals, researchers, data scientists, and various other professionals by providing a unified platform for data sharing.

In one embodiment, the database 127 includes a machine-learning based training database with a pre-defined mapping defining a relationship between various input parameters and output parameters based on various statistical methods. For example, the training database includes machine-learning algorithms to learn mappings between ICD-10 codes and other codes. In one instance, the training database includes a dataset that includes data collections that are not subject-specific (e.g., data collections based on population-wide observations, local, regional, or super-regional observations, and the like). Example datasets include demographic data, scientific and medical-related periodicals and journals, research studies data, and the like. The training database is routinely updated and/or supplemented based on machine learning methods.

By way of example, the UE 103, the EMR system 109, the analysis platform 113, and the database 127 communicate with each other and other components of the communication network 111 using known, new or developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
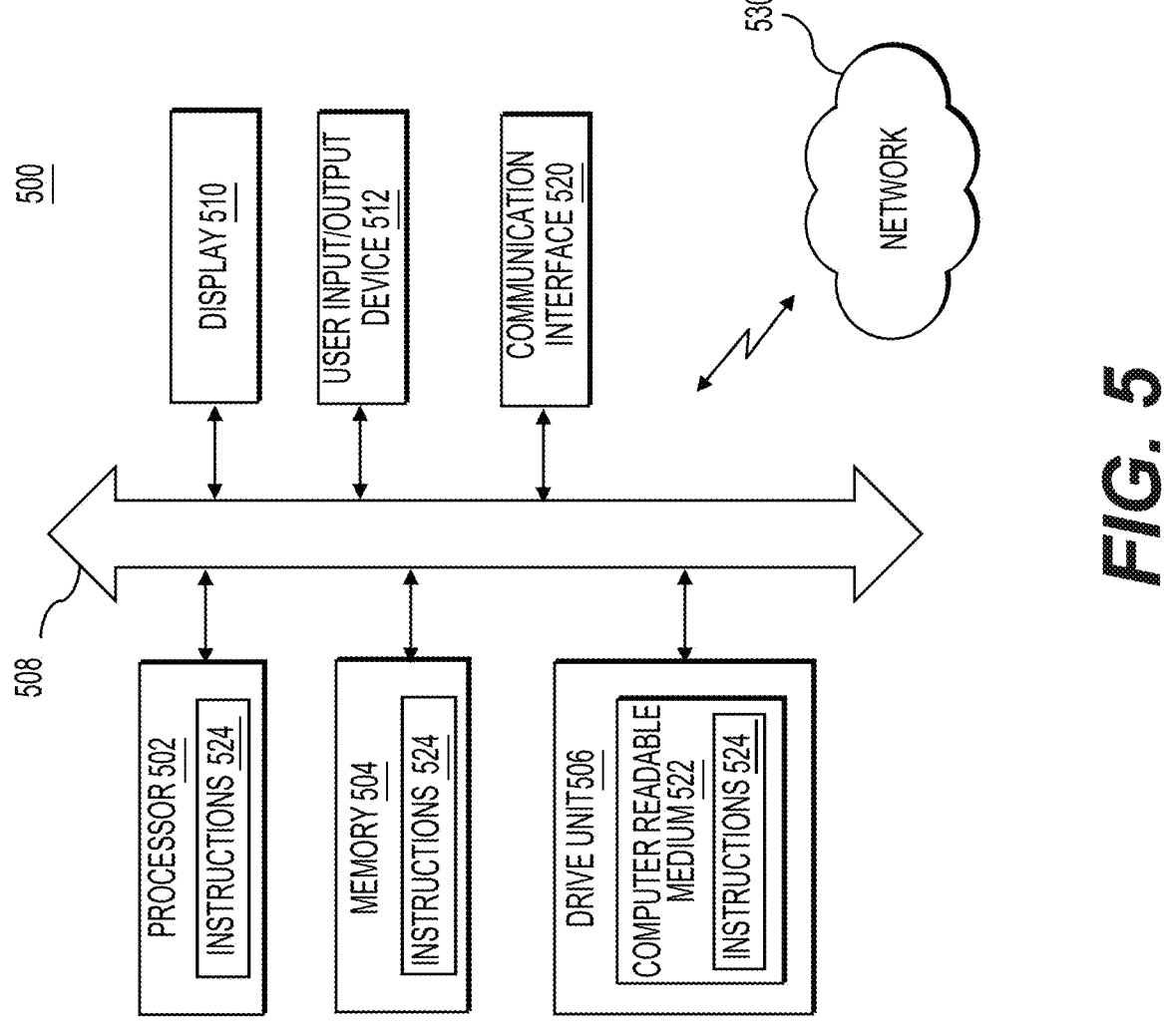
FIG. 5 illustrates an implementation of a computer system that executes techniques presented herein.

FIG. 2 is a flowchart of a process for identifying relationships between complex datasets and/or high-dimensional datasets for predictive modeling, according to aspects of the disclosure. In various embodiments, the analysis platform 113 and/or any of the modules 115-125 performs one or more portions of the process 200 and are implemented using, for instance, a chipset including a processor and a memory as shown in FIG. 5. As such, the analysis platform 113 and/or any of modules 115-125 provide means for accomplishing various parts of the process 200, as well as means for accomplishing embodiments of other processes described herein in conjunction with other components of the system 100. Although the process 200 is illustrated and described as a sequence of steps, it is contemplated that various embodiments of the process 200 are performed in any order or combination and need not include all of the illustrated steps.

In step 201, the analysis platform 113 clusters data associated with one or more entities (e.g., patients) in a first dataset based on distance data. In one embodiment, the analysis platform 113 receives the data from a plurality of data sources (e.g., EMR system 109, database 127, or any other data sources), wherein the data include unique patient identifier, temporal data associated with a service, a description of the service, and/or procedural coding (e.g., ICD codes, CPT codes, or any other standardized codes). The analysis platform 113 processes, utilizing a distance metric (e.g., Euclidean distance or any other distance metric), the data to measure similarity between the procedural coding of the one or more nodes in the first dataset. The analysis platform 113 calculates, utilizing a clustering algorithm (e.g., DBSCAN or any other clustering algorithm), a distance between the similar procedural coding of the one or more nodes. In one example, ICD codes that are close in distance when translated into numerical values are assigned strong edge strength in the graph representation, whereas ICD codes with greater numerical dissimilarity are assigned weaker edge strength, facilitating the identification of closely related medical conditions in the clustering process. In one example, the strength of the edges between ICD codes is determined by calculating the probability of their coexistence within the same record, reflecting the likelihood of certain codes appearing together. Higher probabilities indicate stronger connections, guiding the weighting of edges in the network representation of the data. The analysis platform 113 clusters the one or more nodes in the first dataset based on the calculated distance. In one example, distance data, encompassing metrics like Euclidean, can be applied across various datasets to quantify relationships and similarities between data points. The versatility of distance data highlights its utility in extracting meaningful insights and patterns from diverse datasets across different domains.

In step 203, the analysis platform 113 clusters the data associated with one or more entities in a second dataset based on longitudinal data (e.g., longitudinal patient records). In one embodiment, the analysis platform 113 receives the data from a plurality of data sources (e.g., EMR system 109, database 127, or any other data sources), where the data includes longitudinal data. In one example, longitudinal data is a comprehensive and chronological collection of a subject's medical information including diagnosis data, treatment data, test result data, and/or medication data associated with one or more entities. In one example, longitudinal data is a study design where data is collected for a subject repeatedly over a period of time to allow researchers to observe changes, trends, or developments within those subjects over time. The analysis platform 113 processes the longitudinal data to identify patterns in the procedural coding of one or more nodes in the second dataset. The analysis platform 113 clusters, utilizing the clustering algorithm, one or more nodes in the second dataset based on the identified patterns.

In step 205, the analysis platform 113 consolidates the first dataset and the second dataset into a third dataset based on the weights assigned to one or more edges between one or more nodes in the first dataset and the second dataset. In one embodiment, the analysis platform 113 assigns weights to one or more edges in the first dataset and the second dataset based on the frequency of interaction between one or more nodes, the strength of relationship between one or more connected nodes, and/or distance between the one or more nodes. The analysis platform 113 reconciles the weights of one or more edges in the first dataset and the second dataset based on expert opinions, statistical techniques, and/or Bayesian probabilities. The analysis platform 113 clusters, utilizing a clustering algorithm (e.g., Louvain algorithm, Spectral Clustering, Clauset-Newman-Moore greedy modularity maximization, hierarchical clustering, or any other clustering algorithms), the one or more nodes in the third dataset based on similar edge weights. In one example, the analysis platform 113 combines the two edges together by statistical methods of normalization with customized scales. In one example, the analysis platform 113 utilizes a network clustering algorithm (e.g., Louvaine algorithm, Spectral Clustering, Clauset-Newman-Moore greedy modularity maximization, hierarchical clustering, etc.) to cluster the ICD-10 nodes into appropriate numbers of clusters.

In step 207, the analysis platform 113 generates a diagnosis space (e.g., mathematical space) indicating a condition of one or more entities based on the third dataset. In one instance, the diagnosis space is a simplified representation (e.g., a simplified map) resulting from dimensional reduction techniques applied to the subject's data. This simplified map represents the condensed representation of the subject's illness trajectory, capturing essential patterns and relationships within the data while reducing its complexity. In one embodiment, the analysis platform 113 determines an association between procedural coding within at least one cluster of the third dataset and at least one entity. The analysis platform 113 calculates a weight for at least one cluster based on the association, wherein the weight of the cluster is increased to indicate the presence of a condition within the cluster. The analysis platform 113 adjusts the increased weight of the cluster by decrementing a prior weight of the cluster based on a time factor. In one example, the analysis platform 113 increases the weight of the cluster when a particular disease or condition is mentioned in the subject's record, indicating its relevance or significance at that point in time. However, as time progresses and newer information becomes available, the analysis platform 113 decreases the weight of the cluster to reflect the diminishing influence or relevance of the historical data. This decrementing process considers factors such as the time elapsed since the last mention of the cluster in the subject's record. By dynamically adjusting cluster weights based on temporal factors, this approach ensures that the clustering algorithm remains adaptive and responsive to changes in the subject's condition, thereby improving accuracy. In one example, in each epoch (e.g., specific time interval or event) of a subject's record, the analysis platform 113 calculates the weights of the clustered diagnosis space, by increasing the weight of a medical cluster group when one of the supporting ICD codes is mentioned. This weight is then added to a decremented version of the prior weight based on the time period between the last mention of this cluster and this current mention. Each epoch will have a series of weights assigned to the patient that captures the overall medical statuses that have been received. As new information is received, these weights continue to be updated.

In step 209, the analysis platform 113 determines, via input of the diagnosis space into a machine learning model, an optimization of a weighting scheme for assigning weights to one or more features within the longitudinal data or diagnosis space. The machine learning model incorporates feedback mechanisms to iteratively refine the weights assigned to different dimensions or features within the longitudinal data or diagnosis space to maximize predictive accuracy and clinical relevance. This feedback loop ensures that the weighting scheme effectively captures the most informative aspect of the subject's health data, enhancing the performance and interpretability of the predictive models over time.

Figure 3:
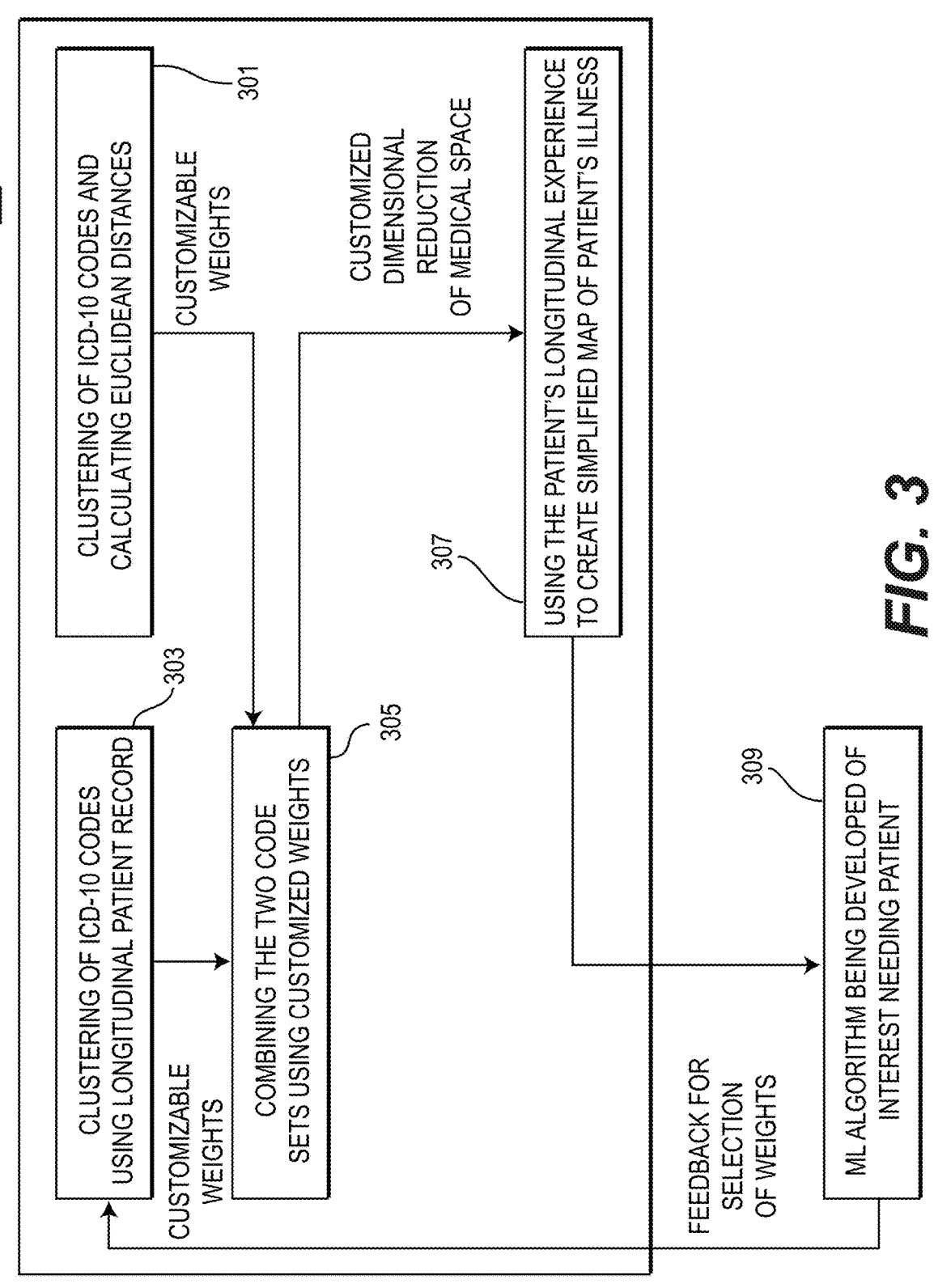
FIG. 3 is a flowchart of a process for leveraging longitudinal patient data to create a simplified representation of the subject's illness for training machine learning algorithms to develop predictive models with feedback mechanisms, according to aspects of the disclosure.

FIG. 3 is a flowchart of a process for leveraging longitudinal patient data to create a simplified representation of the subject's condition for training machine learning algorithms to develop predictive models with feedback mechanisms, according to aspects of the disclosure. Although the process 300 is illustrated and described as a sequence of steps, it is contemplated that various embodiments of the process 300 are performed in any order or combination and need not include all of the illustrated steps.

In step 301, the analysis platform 113 calculates Euclidean distances between pairs of data points. For example, ICD-10 and CPT codes are converted into a numerical representation where each code is assigned a unique numerical value. Once represented numerically, the Euclidean distance between pairs of data is calculated using the standard Euclidean distance formula, which measures the straight-line distance between two points in multidimensional space. This numerical representation enables quantification of the similarity or dissimilarity between codes. The analysis platform 113 applies clustering algorithms (e.g., K-mean, hierarchical clustering, etc.) to the dataset, where each data point represents a unique combination of ICS-10 codes and CPT codes. The clustering process groups similar codes based on their Euclidean distances, with clusters representing coherent sets of codes that share similar characteristics of medical contexts. The analysis platform 113 evaluates the clustering results to assess the quality and coherence of the identified clusters.

In step 303, the analysis platform 113 extracts relevant features from longitudinal patient records. In one instance, a longitudinal patient record is a comprehensive and chronological collection of a subject's medical information, including diagnoses, treatments, procedures, and outcomes. The analysis platform 113 extracts relevant features (e.g., diagnostic codes, procedure codes, temporal data) from the longitudinal patient record. The analysis platform 113 applies clustering algorithms to the feature space to group similar patient records together based on their medical history, conditions, or treatment patterns. The choice of clustering algorithm depends on factors such as the nature of the data, the desired number of clusters, and computational considerations.

In step 305, the analysis platform 113 leverages both initial clustering and longitudinal patient records with customized weights. Initially, the ICD-codes were clustered using Euclidean distances to identify initial grouping based on their similarity. The longitudinal patient records were then incorporated to refine these clusters, utilizing customized weights that prioritize certain features or attributes within the data. In one embodiment, the analysis platform 113 incorporates domain knowledge or expert insights to assign customized weights to each dimension or feature within the longitudinal patient records, reflecting their importance in characterizing the subject's illness trajectory. For example, medical history or laboratory results may be assigned higher weights if they are deemed more influential in determining patient similarity or disease progression. By assigning customized weights the analysis platform 113 prioritizes certain features over others, thereby influencing the clustering outcome.

In step 307, the analysis platform 113 generates a condensed representation of a subject's medical space, where highly informative dimensions are prioritized, while less relevant or redundant dimensions are minimized or excluded. Through various advanced analytical techniques, the dimensional reduction process transforms complex and high-dimensional longitudinal data into a lower-dimensional representation, capturing the essential patterns and relationships within the data. The resulting simplified map of the subject's illness provides a concise yet comprehensive overview for enabling the identification of key trends, detecting anomalies, and tailoring interventions or treatment strategies.

In step 309, the analysis platform 113 inputs the simplified map into the machine learning algorithms (e.g., supervised or unsupervised machine learning models) for further analysis and model development. The machine learning algorithms are trained using the reduced-dimensional representation of the subject's health data. During the training process, the machine learning algorithms learn from the simplified maps to develop predictive models. The machine learning algorithms incorporate a feedback mechanisms to iteratively refine the weights assigned to different dimensions or features in the longitudinal patient records. This feedback loop allows the machine learning algorithms to adapt and optimize the weights based on the predictive performance.

In one example, in a large medical claims database, the analysis platform 113 parses inpatient and outpatient utilization data, and cluster codes are generated to represent patient diagnoses and severity. Each patient is assigned an ICD cluster-based severity score for every quarter, providing insight into their health status over time. When a patient requests knee surgery as an inpatient, the analysis platform 113 employs a classifier to distinguish patients likely to stay in the hospital for more than a predetermined time period (e.g., two nights) based on their ICD cluster severity scores. By leveraging this classifier, patients suitable for inpatient knee surgery can be accurately identified, allowing healthcare providers to allocate resources effectively and ensure appropriate care pathways for patients' surgical needs.

In one example, the analysis platform 113 utilizes the methods and algorithms discussed herein to assign patients into an n-dimensional disease map space (e.g., mathematical space). Each subject's utilization of a specific healthcare service is mapped onto this disease space based on disease regions and probabilities of service use. By grouping patients with a high probability of utilizing certain services together, targeted interventions can be tailored to meet their specific needs. Additionally, the coverage of services by service providers (e.g., insurance companies) can be customized, enabling innovative and efficient delivery of healthcare services that align closely with the identified needs of patient populations within the disease map space.

While the examples described above pertain to clustering of ICD-10 codes and creation of a disease map space, the systems and methods described herein are applicable generally to the field of data processing and predictive analytics. For example, the techniques and systems described above may be applied to: (i) clustering traffic flow data based on congestion patterns helps in optimizing traffic management strategies, (ii) clustering species distribution data based on environmental factors aids in identifying biodiversity hotspots and prioritizing conservation efforts, (iii) clustering neighborhoods based on demographic and socio-economic factors facilitate urban planning and zoning decisions, (iv) clustering students based on academic performance and learning styles assist in designing personalized education plans, (v) clustering transactions based on their similarity aids in identifying potentially fraudulent activities, and so on.

Figure 4:
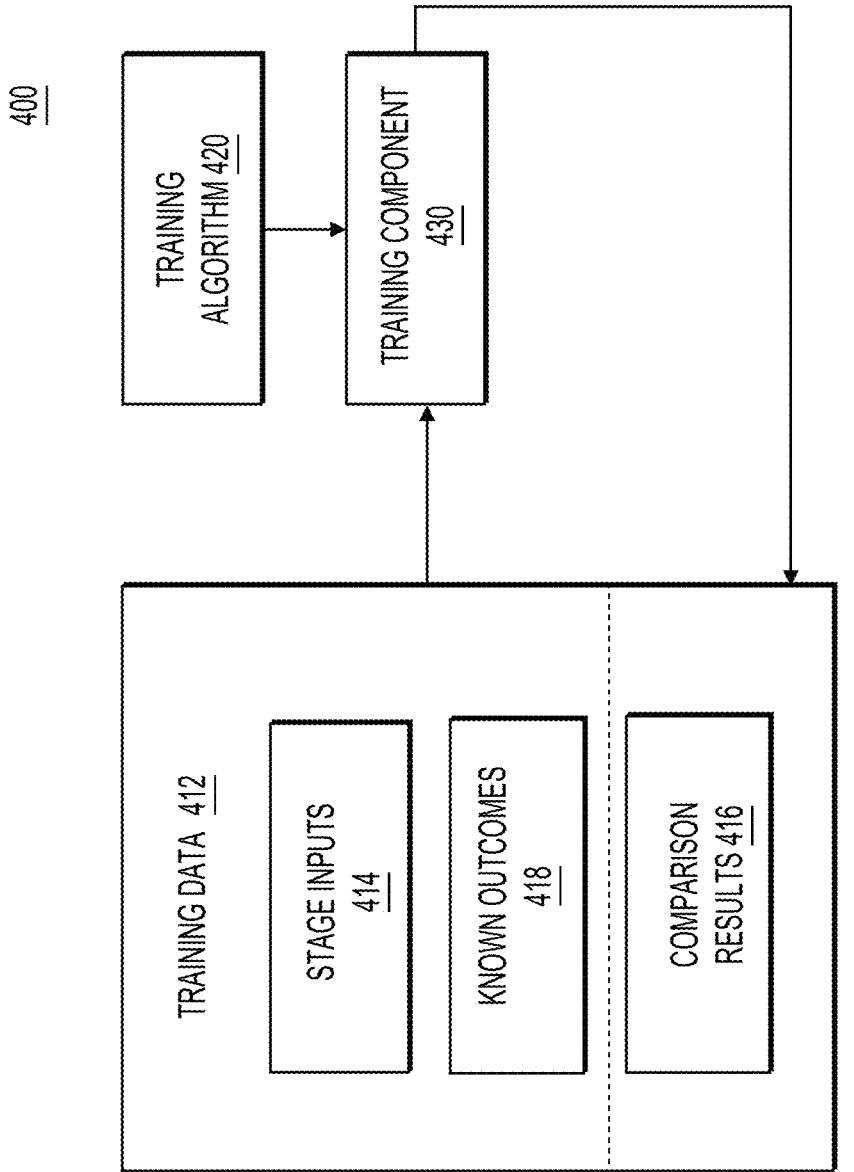
FIG. 4 is a flowchart of an example process for machine learning training.

One or more implementations disclosed herein include and/or are implemented using a machine learning model. For example, one or more of the modules of the analysis platform 113 are implemented using a machine learning model and/or are used to train the machine learning model. A given machine learning model is trained using the training flow chart 400 of FIG. 4. Training data 412 includes one or more of stage inputs 414 and known outcomes 418 related to the machine learning model to be trained. Stage inputs 414 are from any applicable source including text, visual representations, data, values, comparisons, and stage outputs, e.g., one or more outputs from one or more steps from FIG. 2. The known outcomes 418 are included for the machine learning models generated based on supervised or semi-supervised training. An unsupervised machine learning model is not be trained using known outcomes 418. Known outcomes 418 includes known or desired outputs for future inputs similar to or in the same category as stage inputs 414 that do not have corresponding known outputs.

The training data 412 and a training algorithm 420, e.g., one or more of the modules implemented using the machine learning model and/or are used to train the machine learning model, is provided to a training component 430 that applies the training data 412 to the training algorithm 420 to generate the machine learning model. According to an implementation, the training component 430 is provided comparison results 416 that compare a previous output of the corresponding machine learning model to apply the previous result to re-train the machine learning model. The comparison results 416 are used by training component 430 to update the corresponding machine learning model. The training algorithm 420 utilizes machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the processes illustrated in FIGS. 2 and 3 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

FIG. 5 illustrates an implementation of a computer system that executes techniques presented herein. The computer system 500 includes a set of instructions that are executed to cause the computer system 500 to perform any one or more of the methods or computer based functions disclosed herein. The computer system 500 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 500 operates in the capacity of a server or as a client user computer in a server-client user network environment, or as a peer computer system in a peer-to-peer (or distributed) network environment. The computer system 500 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 is implemented using electronic devices that provide voice, video, or data communication. Further, while the computer system 500 is illustrated as a single system, the term "system" shall also be taken to include any collection of systems or sub-systems that individually or jointly execute a set, or multiple sets, of instructions to perform one or more computer functions.

As illustrated in FIG. 5, the computer system 500 includes a processor 502, e.g., a central processing unit (CPU), a graphics processing unit (GPU), or both. The processor 502 is a component in a variety of systems. For example, the processor 502 is part of a standard personal computer or a workstation. The processor 502 is one or more processors, digital signal processors, application specific integrated circuits, field programmable gate arrays, servers, networks, digital circuits, analog circuits, combinations thereof, or other now known or later developed devices for analyzing and processing data. The processor 502 implements a software program, such as code generated manually (i.e., programmed).

The computer system 500 includes a memory 504 that communicates via bus 508. Memory 504 is a main memory, a static memory, or a dynamic memory. Memory 504 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. Memory 504 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts, or tasks illustrated in the figures or described herein are performed by processor 502 executing the instructions stored in memory 504. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 500 further includes a display 510, such as a liquid crystal display (LCD), an organic light emitting diode (OLED), a flat panel display, a solid-state display, a cathode ray tube (CRT), a projector, a printer or other now known or later developed display device for outputting determined information. The display 510 acts as an interface for the user to see the functioning of the processor 502, or specifically as an interface with the software stored in the memory 504 or in the drive unit 506.

Additionally or alternatively, the computer system 500 includes an input/output device 512 configured to allow a user to interact with any of the components of the computer system 500. The input/output device 512 is a number pad, a keyboard, a cursor control device, such as a mouse, a joystick, touch screen display, remote control, or any other device operative to interact with the computer system 500.

The computer system 500 also includes the drive unit 506 implemented as a disk or optical drive. The drive unit 506 includes a computer-readable medium 522 in which one or more sets of instructions 524, e.g. software, is embedded. Further, the sets of instructions 524 embodies one or more of the methods or logic as described herein. Instructions 524 resides completely or partially within memory 504 and/or within processor 502 during execution by the computer system 500. The memory 504 and the processor 502 also include computer-readable media as discussed above.

In some systems, computer-readable medium 522 includes the set of instructions 524 or receives and executes the set of instructions 524 responsive to a propagated signal so that a device connected to network 530 communicates voice, video, audio, images, or any other data over network 530. Further, the sets of instructions 524 are transmitted or received over the network 530 via the communication port or interface 520, and/or using the bus 508. The communication port or interface 520 is a part of the processor 502 or is a separate component. The communication port or interface 520 is created in software or is a physical connection in hardware. The communication port or interface 520 is configured to connect with the network 530, external media, display 510, or any other components in the computer system 500, or combinations thereof. The connection with network 530 is a physical connection, such as a wired Ethernet connection, or is established wirelessly as discussed below. Likewise, the additional connections with other components of the computer system 500 are physical connections or are established wirelessly. Network 530 alternatively be directly connected to the bus 508.

While the computer-readable medium 522 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 522 is non-transitory, and may be tangible.

The computer-readable medium 522 includes a solid-state memory such as a memory card or other package that houses one or more non-volatile read-only memories. The computer-readable medium 522 is a random-access memory or other volatile re-writable memory. Additionally or alternatively, the computer-readable medium 522 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 500 is connected to network 530. Network 530 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 530 includes wide area networks (WAN), such as the Internet, local area networks (LAN), campus area networks, metropolitan area networks, a direct connection such as through a Universal Serial Bus (USB) port, or any other networks that allows for data communication. Network 530 is configured to couple one computing device to another computing device to enable communication of data between the devices. Network 530 is generally enabled to employ any form of machine-readable media for communicating information from one device to another. Network 530 includes communication methods by which information travels between computing devices. Network 530 is divided into sub-networks. The sub-networks allow access to all of the other components connected thereto or the sub-networks restrict access between the components. Network 530 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the present disclosure, various features are sometimes grouped together in a single embodiment, figure, or description thereof for the purpose of streamlining the disclosure and aiding in the understanding of one or more of the various inventive aspects. This method of the present disclosure, however, is not to be interpreted as reflecting an intention that the claimed embodiments require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure are practiced without these specific details. In other instances, well-known methods, structures and techniques have not been shown in detail in order not to obscure an understanding of this description.

Thus, while there has been described what are believed to be the preferred embodiments of the present disclosure, those skilled in the art will recognize that other and further modifications are made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method comprising: clustering, by one or more processors, data associated with one or more entities in a first dataset based on distance data; clustering, by the one or more processors, the data associated with the one or more entities in a second dataset based on longitudinal data; consolidating, by the one or more processors, the first dataset and the second dataset into a third dataset based on weights assigned to one or more edges between one or more nodes in the first dataset and the second dataset; generating, by the one or more processors, a diagnosis space indicating a condition of the one or more entities based on the third dataset; and determining, by the one or more processors via input of the diagnosis space into a machine learning model, an optimization of a weighting scheme for assigning weights to one or more features within the longitudinal data.

Example 2. The computer-implemented method of example 1, wherein clustering the data in the first dataset based on the distance data comprises: receiving, by the one or more processors, the data from a plurality of data sources, wherein the data include procedural coding; processing, by the one or more processors utilizing a distance metric, the data to measure similarity between the procedural coding of the one or more nodes in the first dataset; calculating, by the one or more processors utilizing a clustering algorithm, a distance between the similar procedural coding of the one or more nodes; and clustering, by the one or more processors, the one or more nodes in the first dataset based on the calculated distance.

Example 3. The computer-implemented method of example 2, wherein the distance metric includes an Euclidean distance.

Example 4. The computer-implemented method of any of examples 2-3, wherein the clustering algorithm includes density-based spatial clustering of applications with noise (DBSCAN).

Example 5. The computer-implemented method of any of examples 1-4, wherein clustering the data associated with the one or more entities in the second dataset based on the longitudinal data comprises: receiving, by the one or more processors, the data from a plurality of data sources, wherein the data includes the longitudinal data; processing, by the one or more processors, the longitudinal data to identify patterns in procedural coding of the one or more nodes in the second dataset; and clustering, by the one or more processors utilizing a clustering algorithm, the one or more nodes in the second dataset based on the identified patterns.

Example 6. The computer-implemented method of example 5, wherein the longitudinal data includes one or more of diagnosis data, treatment data, test result data, or medication data associated with the one or more entities.

Example 7. The computer-implemented method of any of examples 1-6, wherein consolidating the first dataset and the second dataset into the third dataset based on the weights assigned to the one or more edges comprises: assigning, by the one or more processors, weights to the one or more edges in the first dataset and the second dataset based on one or more of frequency of interaction between the one or more nodes, strength of relationship between one or more connected nodes, or distance between the one or more nodes; reconciling, by the one or more processors, the weights of the one or more edges in the first dataset and the second dataset based on one or more of expert opinions, statistical techniques, or Bayesian probabilities; and clustering, by the one or more processors utilizing a clustering algorithm, the one or more nodes in the third dataset based on similar edge weights.

Example 8. The computer-implemented method of example 7, wherein the clustering algorithm includes one or more of Louvain algorithm, Spectral Clustering, Clauset-Newman-Moore greedy modularity maximization, or hierarchical clustering.

Example 9. The computer-implemented method of any of examples 1-8, wherein generating the diagnosis space indicating the condition of the one or more entities based on the third dataset comprises: determining, by the one or more processors, an association between procedural coding within at least one cluster of the third dataset and at least one entity; and calculating, by the one or more processors, a weight for the at least one cluster based on the association, wherein the weight of the at least one cluster is increased to indicate a presence of a condition within the at least one cluster.

Example 10. The computer-implemented method of example 9, further comprising: adjusting, by the one or more processors, the increased weight of the at least one cluster by decrementing a prior weight of the at least one cluster based on a time factor.

Example 11. The computer-implemented method of any of examples 1-10, wherein the data include one or more of a unique patient identifier, temporal data associated with a service, a description of the service, an international classification of diseases (ICD) code, or a current procedural terminology (CPT) code.

Example 12. A system comprising: one or more processors of a computing system; and at least one non-transitory computer readable medium storing instructions which, when executed by the one or more processors, cause the one or more processors to perform operations comprising: clustering data associated with one or more entities in a first dataset based on distance data; clustering the data associated with the one or more entities in a second dataset based on longitudinal data; consolidating the first dataset and the second dataset into a third dataset based on weights assigned to one or more edges between one or more nodes in the first dataset and the second dataset; generating a diagnosis space indicating a condition of the one or more entities based on the third dataset; and determining, via input of the diagnosis space into a machine learning model, an optimization of a weighting scheme for assigning weights to one or more features within the longitudinal data.

Example 13. The system of example 12, wherein clustering the data in the first dataset based on the distance data comprises: receiving the data from a plurality of data sources, wherein the data include procedural coding; processing, utilizing a distance metric, the data to measure similarity between the procedural coding of the one or more nodes in the first dataset; calculating, utilizing a clustering algorithm, a distance between the similar procedural coding of the one or more nodes; and clustering the one or more nodes in the first dataset based on the calculated distance.

Example 14. The system of example 13, wherein the distance metric includes an Euclidean distance, and wherein the clustering algorithm includes density-based spatial clustering of applications with noise (DBSCAN).

Example 15. The system of any of examples 12-14, wherein clustering the data associated with the one or more entities in the second dataset based on the longitudinal data comprises: receiving the data from a plurality of data sources, wherein the data includes the longitudinal data; processing the longitudinal data to identify patterns in procedural coding of the one or more nodes in the second dataset; and clustering, utilizing a clustering algorithm, the one or more nodes in the second dataset based on the identified patterns.

Example 16. The system of example 15, wherein the longitudinal data includes one or more of diagnosis data, treatment data, test result data, or medication data associated with the one or more entities.

Example 17. The system of any of examples 12-16, wherein consolidating the first dataset and the second dataset into the third dataset based on the weights assigned to the one or more edges comprises: assigning weights to the one or more edges in the first dataset and the second dataset based on one or more of frequency of interaction between the one or more nodes, strength of relationship between one or more connected nodes, or distance between the one or more nodes; reconciling the weights of the one or more edges in the first dataset and the second dataset based on one or more of expert opinions, statistical techniques, or Bayesian probabilities; and clustering, utilizing a clustering algorithm, the one or more nodes in the third dataset based on similar edge weights.

Example 18. A non-transitory computer readable medium, the non-transitory computer readable medium storing instructions which, when executed by one or more processors of a computing system, cause the one or more processors to perform operations comprising: clustering data associated with one or more entities in a first dataset based on distance data; clustering the data associated with the one or more entities in a second dataset based on longitudinal data; consolidating the first dataset and the second dataset into a third dataset based on weights assigned to one or more edges between one or more nodes in the first dataset and the second dataset; generating a diagnosis space indicating a condition of the one or more entities based on the third dataset; and determining, via input of the diagnosis space into a machine learning model, an optimization of a weighting scheme for assigning weights to one or more features within the longitudinal data.

Example 19. The non-transitory computer readable medium of example 18, wherein clustering the data in the first dataset based on the distance data comprises: receiving the data from a plurality of data sources, wherein the data include procedural coding; processing, utilizing a distance metric, the data to measure similarity between the procedural coding of the one or more nodes in the first dataset, wherein the distance metric includes an Euclidean distance; calculating, utilizing a clustering algorithm, a distance between the similar procedural coding of the one or more nodes, wherein the clustering algorithm includes density-based spatial clustering of applications with noise (DBSCAN); and clustering the one or more nodes in the first dataset based on the calculated distance.

Example 20. The non-transitory computer readable medium of any of examples 18-19, wherein clustering the data associated with the one or more entities in the second dataset based on the longitudinal data comprises: receiving the data from a plurality of data sources, wherein the data includes the longitudinal data, wherein the longitudinal data includes one or more of diagnosis data, treatment data, test result data, or medication data associated with the one or more entities; processing the longitudinal data to identify patterns in procedural coding of the one or more nodes in the second dataset; and clustering, utilizing a clustering algorithm, the one or more nodes in the second dataset based on the identified patterns.

What is claimed is:

1. A computer-implemented method comprising:

performing a first clustering, by one or more processors, of data associated with one or more entities to generate a first dataset based on distance data associated with a first feature within the data, the first dataset including one or more nodes and one or more first edges between the one or more nodes weighted based on the distance data, the one or more nodes representing one or more conditions;

performing a second clustering, by the one or more processors, of the data associated with the one or more entities to generate a second dataset based on frequency data associated with a second feature within the data, the second dataset including the one or more nodes and one or more second edges between the one or more nodes weighted based on the frequency data;

combining, by the one or more processors, the first dataset and the second dataset into combined dataset including the one or more nodes and one or more combined edges between the one or more nodes, the one or more combined edges based on a combining of the one or more first edges and the one or more second edges and weights assigned to the one or more first edges and the one or more second edges;

generating, by the one or more processors, a diagnosis space indicating a condition of the one or more entities based on the combined dataset and longitudinal data associated with the one or more entities; and determining, by the one or more processors via input of the diagnosis space into a machine learning model, an optimization of a weighting scheme for assigning weights to one or more features within the longitudinal data.

2. The computer-implemented method of claim 1, wherein performing the first clustering of the data to generate the first dataset based on the distance data comprises:

receiving, by the one or more processors, the data from a plurality of data sources, wherein the data include, as the first feature, procedural coding;

processing, by the one or more processors utilizing a distance metric, the data to measure similarity between the procedural coding of the one or more nodes in the first dataset;

determining, by the one or more processors utilizing a clustering algorithm, a distance between the similar procedural coding of the one or more nodes; and clustering, by the one or more processors, the one or more nodes in the first dataset based on the distance.

3. The computer-implemented method of claim 2, wherein the distance metric includes an Euclidean distance.

4. The computer-implemented method of claim 2, wherein the clustering algorithm includes density-based spatial clustering of applications with noise (DBSCAN).

5. The computer-implemented method of claim 1, further comprising:

identifying patterns in procedural coding of the one or more nodes in the combined dataset; and clustering, by the one or more processors utilizing a clustering algorithm, the one or more nodes in the combined dataset based on the identified patterns.

6. The computer-implemented method of claim 1, wherein the longitudinal data includes one or more of diagnosis data, treatment data, test result data, or medication data associated with the one or more entities.

7. The computer-implemented method of claim 1, wherein combining the first dataset and the second dataset into the combined dataset comprises:

assigning, by the one or more processors, first weights to the one or more first edges in the first dataset based on the distance data and second weights to the one or more second edges in the second dataset based on the frequency data;

reconciling, by the one or more processors, the first weights of the one or more first edges in the first dataset and the second weights of the one or more second edges in the second dataset based on one or more of expert opinions, statistical techniques, or Bayesian probabilities; and clustering, by the one or more processors utilizing a clustering algorithm, the one or more nodes in the combined dataset based on similar edge weights of the one or more combined edges.

8. The computer-implemented method of claim 7, wherein the clustering algorithm includes one or more of Louvain algorithm, Spectral Clustering, Clauset-Newman-Moore greedy modularity maximization, or hierarchical clustering.

9. The computer-implemented method of claim 1, wherein generating the diagnosis space indicating the condition of the one or more entities based on the combined dataset and the longitudinal data associated with the one or more entities comprises:

determining, by the one or more processors, an association between procedural coding within at least one cluster of the combined dataset and at least one entity from the one or more entities; and determining, by the one or more processors, a weight for the at least one cluster based on the association, wherein the weight of the at least one cluster is increased to indicate a presence of a condition within the at least one cluster.

10. The computer-implemented method of claim 9, further comprising:

adjusting, by the one or more processors, the increased weight of the at least one cluster by decrementing a prior weight of the at least one cluster based on a time factor.

11. The computer-implemented method of claim 1, wherein the data include one or more of a unique patient identifier, temporal data associated with a service, a description of the service, an international classification of diseases (ICD) code, or a current procedural terminology (CPT) code.

12. A system comprising:

one or more processors; and one or more non-transitory computer-readable media storing processor-executable instructions which, when executed by the one or more processors, cause the one or more processors to perform operations comprising:

performing a first clustering of data associated with one or more entities to generate a first dataset based on distance data associated with a first feature within the data, the first dataset including one or more nodes and one or more first edges between the one or more nodes weighted based on the distance data, the one or more nodes representing one or more conditions;

performing a second clustering of the data associated with the one or more entities to generate a second dataset based on frequency data associated with a second feature within the data, the second dataset including the one or more nodes and one or more second edges between the one or more nodes weighted based on the frequency data;

combining the first dataset and the second dataset into a combined dataset including the one or more nodes and one or more combined edges between the one or more nodes, the one or more combined edges based on a combining of the one or more first edges and the one or more second edges and weights assigned to the one or more first edges and the one or more second edges;

generating a diagnosis space indicating a condition of the one or more entities based on the combined dataset and longitudinal data associated with the one or more entities; and determining, via input of the diagnosis space into a machine learning model, an optimization of a weighting scheme for assigning weights to one or more features within the longitudinal data.

13. The system of claim 12, wherein performing the first clustering of the data to generate the first dataset based on the distance data comprises:

receiving the data from a plurality of data sources, wherein the data include, as the first feature, procedural coding;

processing, utilizing a distance metric, the data to measure similarity between the procedural coding of the one or more nodes in the first dataset;

determining, utilizing a clustering algorithm, a distance between the similar procedural coding of the one or more nodes; and clustering the one or more nodes in the first dataset based on the distance.

14. The system of claim 12, the operations further comprising:

identifying patterns in procedural coding of the one or more nodes in the combined dataset; and clustering, utilizing a clustering algorithm, the one or more nodes in the combined dataset based on the identified patterns.

15. The system of claim 12, wherein the longitudinal data includes one or more of diagnosis data, treatment data, test result data, or medication data associated with the one or more entities.

16. The system of claim 12, wherein combining the first dataset and the second dataset into the combined dataset comprises:

assigning first weights to the one or more first edges in the first dataset based on the distance data and second weights to the one or more second edges in the second dataset based on the frequency data;

reconciling the first weights of the one or more first edges in the first dataset and the second weights of the one or more second edges in the second dataset based on one or more of expert opinions, statistical techniques, or Bayesian probabilities; and clustering, utilizing a clustering algorithm, the one or more nodes in the combined dataset based on similar edge weights of the one or more combined edges.

17. One or more non-transitory computer-readable media storing processor-executable instructions which, when executed by one or more processors, cause the one or more processors to perform operations comprising:

performing a first clustering of data associated with one or more entities to generate a first dataset based on distance data associated with a first feature within the data, the first dataset including one or more nodes and one or more first edges between the one or more nodes weighted based on the distance data, the one or more nodes representing one or more conditions;

performing a second clustering of the data associated with the one or more entities to generate a second dataset based on frequency data associated with a second feature within the data, the second dataset including the one or more nodes and one or more second edges between the one or more nodes weighted based on the frequency data;

combining the first dataset and the second dataset into a combined dataset including the one or more nodes and one or more combined edges between the one or more nodes, the one or more combined edges based on a combining of the one or more first edges and the one or more second edges and weights assigned to the one or more first edges and the one or more second edges;

generating a diagnosis space indicating a condition of the one or more entities based on the combined dataset and longitudinal data associated with the one or more entities; and determining, via input of the diagnosis space into a machine learning model, an optimization of a weight-ing scheme for assigning weights to one or more features within the longitudinal data.

18. The one or more non-transitory computer-readable media of claim 17, wherein performing the first clustering of the data to generate the first dataset based on the distance data comprises:

receiving the data from a plurality of data sources, wherein the data include, as the first feature, procedural coding;

processing, utilizing a distance metric, the data to measure similarity between the procedural coding of the one or more nodes in the first dataset, wherein the distance metric includes an Euclidean distance;

determining, utilizing a clustering algorithm, a distance between the similar procedural coding of the one or more nodes, wherein the clustering algorithm includes density-based spatial clustering of applications with noise (DBSCAN); and clustering the one or more nodes in the first dataset based on the distance.

19. The one or more non-transitory computer-readable media of claim 17, the operations further comprising:

identifying patterns in procedural coding of the one or more nodes in the combined dataset; and clustering, utilizing a clustering algorithm, the one or more nodes in the combined dataset based on the identified patterns.

20. The computer-implemented method of claim 1, wherein the second feature is an entity identifier of the one or more entities, and performing the second clustering of the data to generate the second dataset based on the frequency data comprises:

processing, by the one or more processors, the data to determine, for a same entity identifier, an association between one or more pairs of procedural codings of the one or more nodes in the second dataset;

determining, by the one or more processors, a frequency of associations between the one or more pairs of procedural codings across entity identifiers of the one or more entities; and clustering, by the one or more processors, the one or more nodes in the second dataset based on the frequency.

* * * * *